(12) United States Patent
Gottipati et al.

(10) Patent No.: US 11,218,296 B2
(45) Date of Patent: Jan. 4, 2022

(54) DATA DE-DUPLICATION AMONG UNTRUSTED ENTITIES

(71) Applicant: Druva, Inc., Sunnyvale, CA (US)

(72) Inventors: Srikiran Gottipati, Sunnyvale, CA (US); Milind Borate, Sunnyvale, CA (US)

(73) Assignee: Druva Inc., Sunnyvale, CA (US)

( * ) Notice: Subject to any disclaimer, the term of this patent is extended or adjusted under 35 U.S.C. 154(b) by 251 days.

(21) Appl. No.: 16/505,269

(22) Filed: Jul. 8, 2019

(65) Prior Publication Data

US 2020/0259636 A1      Aug. 13, 2020

(30) Foreign Application Priority Data

Feb. 9, 2019  (IN) .............................. 201941005180

(51) Int. Cl.
| | |
|---|---|
| *H04L 9/08* | (2006.01) |
| *H04L 9/32* | (2006.01) |
| *H04L 9/00* | (2006.01) |
| *G06F 3/06* | (2006.01) |

(52) U.S. Cl.
CPC ............ *H04L 9/0822* (2013.01); *G06F 3/067* (2013.01); *G06F 3/0623* (2013.01); *G06F 3/0641* (2013.01); *H04L 9/008* (2013.01); *H04L 9/3236* (2013.01)

(58) Field of Classification Search
CPC ..... H04L 9/0822; H04L 9/3236; H04L 9/008; H04L 9/3239; H04L 9/0961; G06F 3/0641; G06F 3/067; G06F 3/0623; G06F 3/0608
See application file for complete search history.

(56) References Cited

U.S. PATENT DOCUMENTS

| | | | |
|---|---|---|---|
| 8,259,934 B2 | 9/2012 | Karroumi et al. | |
| 8,396,841 B1* | 3/2013 | Janakiraman | ........... G06F 3/067 707/692 |
| 10,152,487 B1* | 12/2018 | Patwardhan | ........ G06F 21/6218 |

(Continued)

OTHER PUBLICATIONS

"Secure Data Deduplication"—Storer et al., Storage Systems Research Center, University of California, Santa Cruz, Oct. 31, 2018 https://dl.acm.org/doi/10.1145/1456469.1456471 (Year: 2018).*

(Continued)

*Primary Examiner* — Randy A Scott
(74) *Attorney, Agent, or Firm* — Fenwick & West LLP

(57) ABSTRACT

A data storage system allows data to be encrypted and de-duplicated at the same system. By way of example, a server of the data storage system may request a client device which intends to upload a data block to transmit a first fingerprint of the data block to the server. The first fingerprint may be derived from the plaintext of the data block. The server may apply a one-way function to the first fingerprint to generate an encryption key and transmit the encryption key to the client device. The client device uses the encryption key to encrypt the data block and generates a second fingerprint which is derived from the ciphertext of the data block. The server uses both the first fingerprint and the second fingerprint to verify the data block and the legitimacy of the client attempting to upload the data block.

20 Claims, 7 Drawing Sheets

(56) References Cited

U.S. PATENT DOCUMENTS

2015/0227757 A1* 8/2015 Bestler ................. H04L 9/3239
　　　　　　　　　　　　　　　　　　　　　　　　713/167

OTHER PUBLICATIONS

"PerfectDedup: Secure Data Deduplication"—Puzio et al, Eurecom, Sophia Antipolis, Sep. 22, 2015 https://link.springer.com/chapter/10.1007/978-3-319-29883-2_10 (Year: 2015).*

Storer, M. W. et al., "Security Data Deduplication," Storage Systems Research Center, University of California, Santa Cruz, Proceedings of the 4th ACM international workshop on Storage security and survivability, ACM, Oct. 31, 2008, 10 pages.

* cited by examiner

DATA DE-DUPLICATION AMONG UNTRUSTED ENTITIES

CROSS REFERENCE TO RELATED APPLICATION

This application claims the benefit of Indian Provisional Application No. 201941005180, filed Feb. 9, 2019, which is incorporated by reference in its entirety.

TECHNICAL FIELD

The disclosure generally relates to data storage, and in particular to, providing encryption and data de-duplication to a data storage system.

BACKGROUND

As cloud storage becomes increasingly prevalent, there is an increasing demand for storage systems that can provide secure data storage in a cost-effective manner. On one hand, it is desirable to store data in the cloud in encrypted forms to maintain the confidentiality of the data. On the other hand, a data storage may try to reduce the storage space by de-duplicating the same files and data that are shared among different individual clients. For example, if two different clients upload the same file to a cloud storage system, the storage system may only need to save one copy of the file to allow both clients to access the file.

However, data encryption and data de-duplication are often in conflict, forcing a data storage system in a dilemma to choose between confidentiality and storage efficiency. It is because data duplication may rely heavily on identical contents to reduce the storage space. Yet, data encryption attempts to make all content apparently random. By way of example, when a first client encrypts a file, the encrypted file could be completely different from the encrypted file created by a second client based on the same file. This makes de-duplication across different clients extremely challenging because the same underlying data, when encrypted, often becomes two completely different strings of data bits.

DETAILED DESCRIPTION

Figure 1:
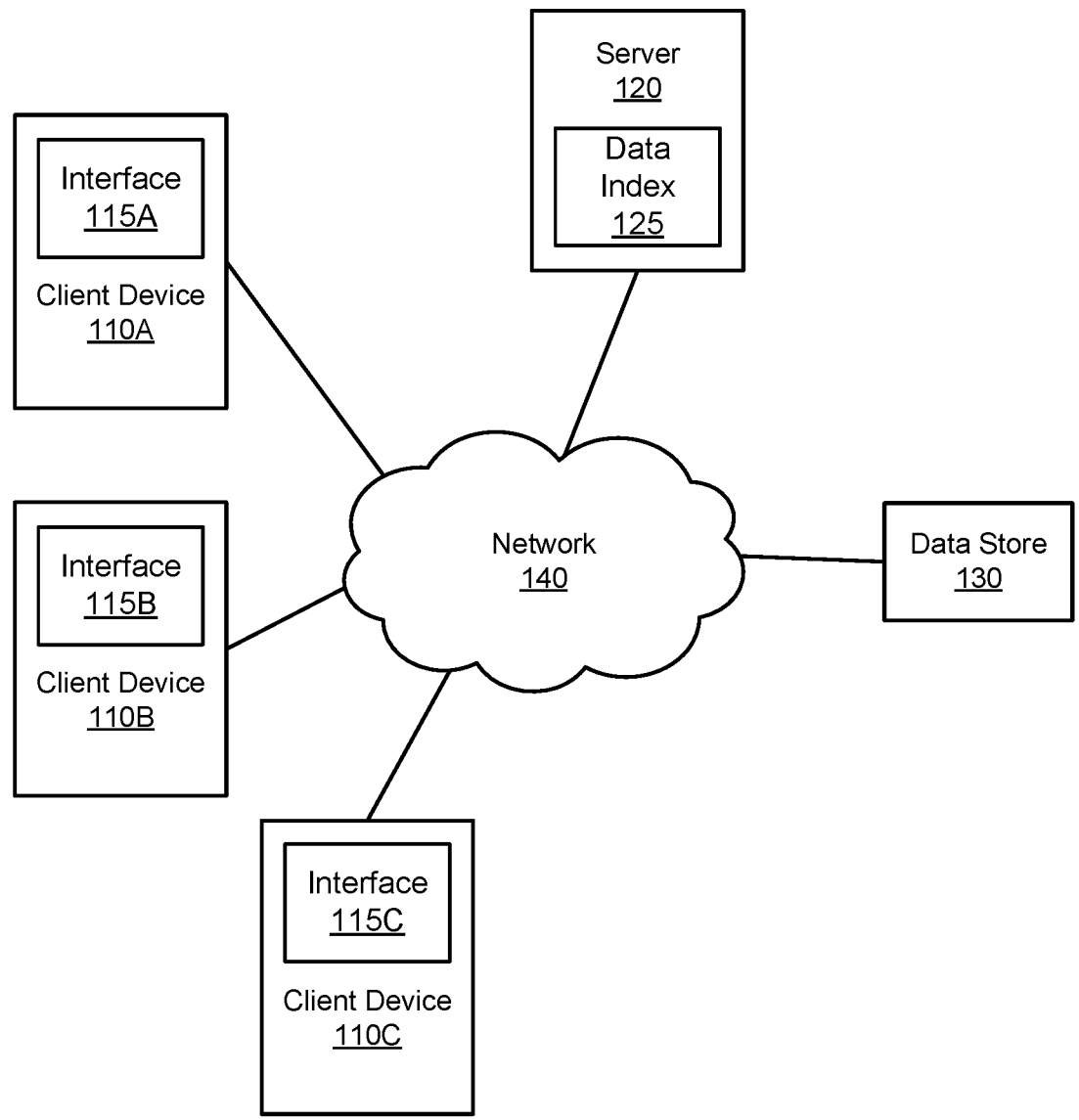
FIG. 1 illustrates an example storage system environment, in accordance with an embodiment.

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Systems, methods, and non-transitory computer readable media provide data and user verification in a data storage system that may perform data de-duplication and encryption. In an example embodiment, a storage system may include a server that manages a data store and authorizes various clients, who are not necessarily trusted by the server, to upload encrypted data to the data store. The server may also manage and maintain a data index that includes records of data locations, clients' authority to access data, and data de-duplication. Some of the data stored in the data store may be encrypted. For those data, the data index may store the fingerprints of the ciphertext of the data and uses the fingerprints to determine whether a duplicative data block exists in the data store. In some embodiments, the fingerprints may be the checksums of the data.

In one example process where a client attempts to upload a data block, the server may request the client device to generate a first fingerprint of the plaintext of the data block. The first fingerprint also may be referred to as a plaintext fingerprint. Receiving the first fingerprint, the server may apply a one-way function to the first fingerprint to generate an encryption key. The server may transmit the encryption key to the client device, which uses the encryption key to encrypt the plaintext of the data block. The client device may generate a second fingerprint that is derived from the ciphertext of the data block. The second fingerprint also may be referred to as a ciphertext fingerprint. The server may receive the second checksum from the client device and use both the first and second fingerprints to verify the data block and the client's legitimacy. The server may determine whether the ciphertext of the data block is saved in the data store by verifying whether the second fingerprint is referenced in the data index.

The verification of the data block may be conducted through comparing the received first and second fingerprints to the fingerprints saved in the data index. For example, the server may determine whether the second fingerprint is referenced in the data index. A second fingerprint may be referenced in the data index when an index entry includes the second fingerprint as an identifier or as a value. The existence of a reference indicates that the data block has already been stored in the data store. In response to the second fingerprint being referenced in the data index, the server may compare the received first fingerprint to a stored first fingerprint. The stored first fingerprint is a value that represents the fingerprint of the plaintext of the data block that is stored in the data store. By comparing the received first fingerprint and the stored first fingerprint, the server can verify whether the current client who is attempting to upload the data block truly possesses the data block.

In the event when the received first fingerprint and the stored first fingerprint do not match, the server may retrieve the data block that is stored in the data store and generate a third fingerprint which is derived from the plaintext of the stored data block. The server may compare the third fingerprint to the received first fingerprint and the stored first fingerprint to see whether the third fingerprint matches any of the two. If the third fingerprint matches the stored first fingerprint, it indicates that the current client fails to pass the challenge and the current client could potentially be a malicious party. In response, the server may reject the current client's request. If the third fingerprint matches the received first fingerprint that is provided by the current client, it indicates that the previous client who originally uploaded the data block might have been a potentially malicious party. In response, the server may allow the current client to continue to upload the data while disassociating connections between the previous client and the data store and revoking some of the authorities or access privileges of the previous client.

The use of two fingerprints to verify a data block allows clients who are not necessarily trusted by the storage system to upload encrypted data blocks and enables the storage system to perform data de-duplication across different independent clients. By using the first fingerprint to generate an encryption key, the server may control the generation of any encryption keys because the one-way function that generates the keys often depends on a secret key of the server or a nonce that is only known to the server. Hence, the challenge for the client to provide two fingerprints addresses various potential vulnerabilities of the storage system. Additionally, this process may also conform to common requirements of envelope encryption. Encrypted yet de-duplicated data can be stored directly to a cloud data store such as an object store without a need of having a central trusted entity such as the server to perform data encryption, therefore reducing the burden on the server.

System Overview

Referring now to FIG. 1, shown in a block diagram that illustrates an embodiment of an example storage system environment 100, in accordance with an embodiment. By way of example, the storage system environment 100 includes one or more client devices, e.g., 110A, 110B, 110C, etc., one or more data servers 120 and one or more data stores 130. In various embodiments, the environment 100 may include fewer and additional components. A data server 120 may be a file management server that provides data storage services to client devices 110 through one or more data stores 130. The various components in the storage system environment 100 may each correspond to a separate and independent entity or some of the components may be controlled by the same entity. For example, in one embodiment, the server 120 and the data store 130 may be controlled and operated by the same data storage provider company while each client device 110 may be controlled by an individual client. In another embodiment, the server 120 and the data store 130 may be controlled by separate entities. In one embodiment, each of the various components in the storage system environment 110 may be communicated through the network 140. In other words, the storage system environment 100 may be referred to as a cloud storage environment. In some cases, some of the components in the environment 100 may be communicated through local connections. For example, the server 120 and the data store 130 may be communicated locally.

A client device 110 may be controlled by a client of the server 120 who may send a request to store, read, search, delete, and/or modify data stored in the data store 130. Examples of data files include, but are not limited to, a text file, an image file, an audio clip, a video clip, an email, or any combination thereof. The data stored may be in plaintext or be ciphertext that is encrypted from the plaintext. The client devices 110 may be any computing devices that have data that may need to be stored in the data store 130. Examples of such client devices 110 include personal computers (PC), desktop computers, laptop computers, tablet computers, smartphone, wearable electronic devices such as smartwatches, or any other suitable electronic devices. The client devices 110 also may be server-type devices that may need backup, such as web servers, file servers, database servers, etc. The clients may be of different natures such as including individual end users, organizations, businesses, webpage providers, servers, and other clients that use different types of client devices that run on different operating systems. From the point of view of the server 120, various client devices 110 may be treated in the same or a similar manner.

An interface 115 may be communicated to the data server 120 and be run at a client device 110. When the client device 110 attempts to store, read, search, delete, or modify a file stored at the data store 130, the client device 110 may communicate to the data server 120 through the interface 115. The interface 115 may take different forms. In one embodiment, the interface 115 is an application interface that is provided and controlled by the data server 120. For example, the data server 120 may be a cloud storage service provider that provides a front-end software application that can be installed, run, or displayed at a client device 110. In one case, the front-end software application is a software application that can be download and installed at client devices 110 for the clients to manage their files. In another case, the front-end software application takes the form of a webpage interface of the data server 120 that allows clients to manage clients' files through web browsers. The front-end software application may include a graphical user interface (GUI) that is configured to display files stored in the data store 130 graphically in a particular manner (e.g., organized by file hierarchy). In another embodiment, the interface 115 may not include graphical elements but may communicate with the data server 120 via other suitable ways such as application program interfaces (APIs). The interface 115 facilitates the exchange of data between the client device 110 and the data store 130 through the data server 120 in a manner that will be discussed in further detail in association with FIG. 3.

A server 120 enables the client devices 110 to store and access data stored in the data store 130. The server 120 may also manage the files and data in the data store 130. While an interface 115 is run at a client device 110, the data server 120 may be the publisher of the interface 115 and may partially control the operation of the interface 115 such as by determining the operations of the interface 115 and/or the contents and information to be displayed at the interface 115. Additionally, or alternatively, the server 120 may provide APIs for the access and management of files from the client devices 110. The server 120 may manage, coordinate, and communicate with other components such as coordinating the communications between a client device 110 and the data store 130. The server 120 may take the form of software, hardware, or a combination thereof (e.g., a computing machine of FIG. 7). For example, parts of the server 120 may be a PC, a tablet PC, a smartphone, an internet of things (IoT) appliance, or any machine capable of executing instructions that specify actions to be taken by that machine. Parts of the server 120 may include one or more processing units (e.g., a central processing unit (CPU), a graphics processing unit (GPU), a digital signal processor (DSP), a controller, a state machine, one or more ASICs, one or more RFICs, or any combination of these) and a memory. In one embodiment, the server 120 may be implemented using one or more computer servers that have a network communications capability. In another embodiment, the server 120 is implemented using cloud services such as AMAZON WEB SERVICES, GOOGLE CLOUD or MICROSOFT AZURE. The details of the operations and sub-components of the data server 120 will be further discussed in association with FIGS. 2A-7.

The data store 130 may include one or more computers that include storage units that may take the form of a non-transitory and non-volatile computer storage medium to store various data. In one embodiment, the data store 130 may also take the form of an object storage system. Example object storage systems include AMAZON S3, RACKSPACE CLOUD FILES, AZURE BLOB STORAGE, GOOGLE CLOUD STORAGE. Object storage (also known as object-based storage) is a computer data storage architecture that manages data as objects, as opposed to other storage architectures like file storage which manages data as a file hierarchy and block storage which manages data as blocks within sectors and tracks. Each object may typically include the data of the object itself, a variable amount of metadata of the object, and a unique identifier that identifies the object. The unique identifier may take the form of a fingerprint (e.g., checksum) of the underlying data of the object itself. Even if only a small number of bits are changed in the underlying data, the fingerprint could be changed significantly. Hence, unlike data files or data blocks, once an object is created, normally it could be difficult to change. However, unlike file or blocks that often need an operating system of a computer to be accessed, objects may often be accessed directly from a data store and/or through API calls. This allows object storage to scale efficiently in light of various challenges in storing big data.

Alternatively, or additionally, the data store 130 may be a distributed, often decentralized, system that distributes data among different nodes to provide better data access and operation in case of a failure or offline of one or more nodes. The data store 130 may be a NoSQL database server. The data store 130 may be used for data de-duplication purpose. Checksums of data (e.g., snapshots) are created as the de-duplication indices of the data. The de-duplication indices may be stored in a data index 125. For more details about how the data store 130 may operate as a distributed system with the de-duplication indices, U.S. Pat. No. 8,996,467, patented on Mar. 31, 2015, entitled "Distributed Scalable De-duplicated Data Backup System" is incorporated herein by reference for all purposes.

The data store 130 may be associated with one or more data indices 125 that may be used to store index information and/or metadata regarding data structure, address, and other file management data of the data store 130 so that the data can be retrieved efficiently. In one embodiment as shown in FIG. 1, a data index 125 may be stored in the server 120 and managed by the server 120. In other embodiments, the data index 125 may be stored in other locations such as the data store 130 or another storage location. The data index 125 can be in any suitable format that identifies the locations and organizations of data stored in data store 130. For example, the data index 125 may include namespace entries of data blocks. The namespace entries may identify namespace metadata such as file names, versions, modification time, size, etc. Each entry of data is associated with an identifier that may uniquely identify the data and the address of the data in the data store 130. In some cases, the identifier may be associated with the fingerprint of the underlying data. In some cases, the fingerprint may serve directly as the identifier.

By way of example, the data store 130 may be a data de-duplication system. When a client device transmits a potentially new data block (e.g., a number of bits) to the server 120 to store at the data store 130, the server 120 may also receive the fingerprint of the data block (or the server 120 may directly determine the fingerprint). A fingerprint may represent a unique summary of the data block, which may sometimes be referred to as a message digest of the data block. The fingerprint may be derived by a checksum algorithm, a hash algorithm, or a fingerprint algorithm, depending on embodiments. For example, the algorithm may be a secure hash algorithm (SHA) a message digest algorithm (MD). In one case, the fingerprint is a checksum of the data block. Based on the fingerprint, the server 120 examines the data index 125 to determine whether the fingerprint is referenced in the data index 125. For example, a fingerprint is referenced in the data index 125 when the server 120 is able to locate an index entry that includes or is associated with the fingerprint.

Other ways to reference the fingerprint in the data index 125 also may be possible. If the fingerprint is referenced in the data index 125 in an index entry, the server 120 determines that the same data block has already been stored in the data store 130. In response, instead of adding the same data block to the data store 130 twice, the server 120 adds an association between of the client and the index entry so that the data index 125 has a record that the client is associated with the data block. For example, in those embodiments where the data store 130 is an object storage system, the fingerprint of the data block may be used directly as the identifier in an index entry to uniquely identify the data block.

The index entry may include other information such as the clients that are associated with the entry (i.e., clients that should have access to the data blocks), the location of the data block in the data store 130, and other namespace metadata. In some embodiments, the data index 125 may take the form of key-value pairs. For example, the fingerprints of the data blocks may serve as the keys while information such as data location, user identifiers, and namespace metadata may be the values of a particular key-value pair.

The data store 130 may store different types of data including both encrypted data and unencrypted data. In some embodiments, the types of fingerprint used to reference encrypted data and to reference unencrypted data may be different. For example, for unencrypted data, the plaintext of the data block may be used to generate the fingerprint. On the contrary, for encrypted data, the ciphertext of the data block may be used to generate the fingerprint. In some embodiments, the data index 125 may store both two fingerprints for each encrypted data. The two fingerprints are the fingerprint of the plaintext of the data block and the fingerprint of the ciphertext of the data block. The fingerprint of the ciphertext of the data block may be used as the identifier (e.g., the key) of a data entry in the data index 125. The details of how encrypted data blocks are stored in the data store 130 will be further discussed in association with FIGS. 2-6.

The storage system enables the secure exchanges of encrypted data among different entities and the de-duplication of encrypted data, even though some of the entities are not trusted in the system. For example, in one embodiment, the server 120 and the data store 130 may be trusted entities while the client devices 110 do not need to be completely trusted. The processes described in FIGS. 2-6 can detect potentially malicious parties in saving encrypted data.

The communications among the client devices 110, the server 120, and the data store 130 may be transmitted via a network 140, for example, via the Internet. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the Internet.

Example Server Configuration

Figure 2A:
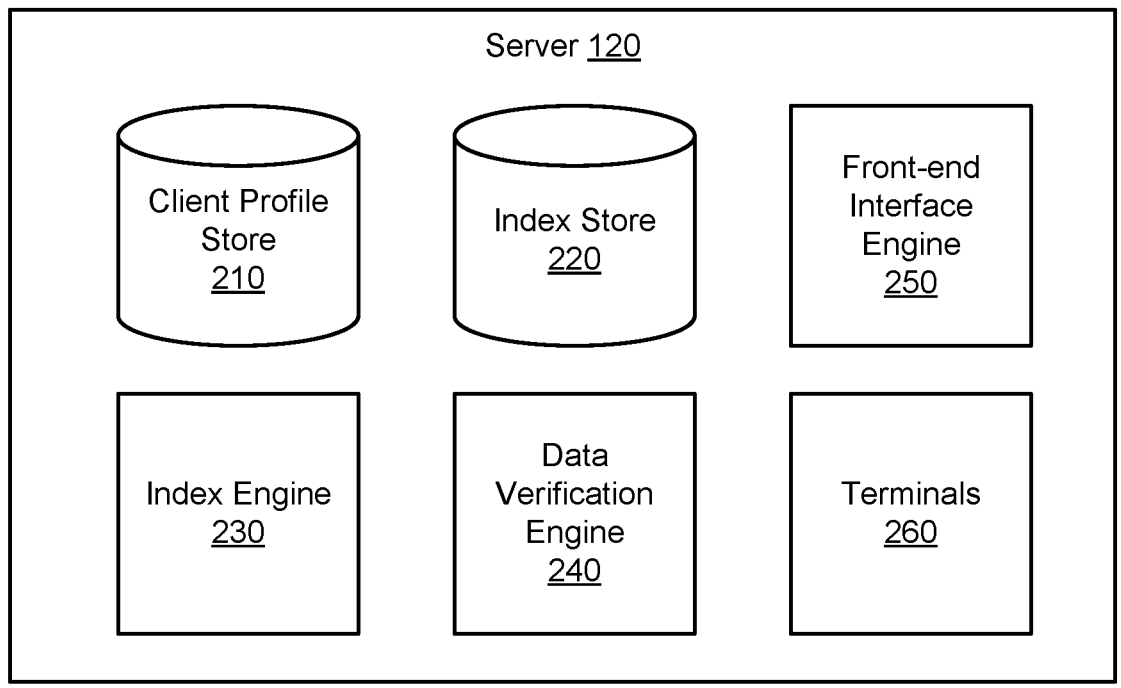
FIG. 2A illustrates a block diagram of an example server, in accordance with an embodiment.

FIG. 2A illustrates a block diagram of an example server 120, in accordance with an embodiment. The server 120 may include a client profile store 210, an index store 220, an index engine 230, a data verification engine 240, a front-end interface engine 250, and one or more terminals 260. In other embodiments, the server 120 may include additional, fewer, or different components for various applications. In one embodiment, the server 120 may be implemented by a computer and each of the components may be hardware and/or software applications run on the server 120. In another embodiment, some of the components may be separate computing machines such that the components cooperate to form the server 120.

The client profile store 210 stores information of clients, which may include log-in credentials, profile information of clients, and information associated with client devices 110 used by the clients. Each log-in account may be associated with a client identifier that uniquely identifies a client. The client identifier may be used in the data index 125 to identify data to which the client has access. For example, the user account name (or a version of the user account name such as a hash of the user account) may be used as the unique client identifier of the client. In the data index 125, data entries corresponding to the data to which the client has access may include the client identifier so that the server 120 can control the access of data in the data store 130. In some embodiments, each client profile in the client profile store 210 may also store the index entry identifiers of data blocks to which the client has access. For example, fingerprints of the data blocks or other forms of index entry identifiers may be stored in the client profile.

The index store 220 may store various entries of the data index 125. The data index 125 may include various information such as where data is stored in the data store 130, how a larger file is partitioned into data blocks (a smaller file may correspond to a single data block), which clients have access to the data blocks, etc. In one embodiment, the data index 125 may be implemented as a look-up table. In another embodiment, the data index 125 may be implemented as key-value pairs. The data index 125 also may include mapping information of a file. For example, a file from a client device 110 can be split into multiple partitions, and each partition can be stored at different storage machines of the data store 130 (e.g., the data store 130 may be a distributed storage system). Through the data index 125, the server 120 may identify which data block is associated with which partitions, and at which storage machine of the data store 130 the partitions are stored. While the index store 220 is shown to be associated with the server 120, in other embodiments the data index 125 may be stored in other locations such as in the data store 130.

The index engine 230 may manage the creations, edits, and deletions of the index entries in the data index 125 stored in the index store 220. The index engine 230 may perform data de-duplication and index entry management. When a client device 110 requests to store a data block (or a file that includes one or more data blocks) to the data store 130, the index engine 230 determines whether the data block has a duplicative copy in the data store 130. If the data block already exists in the data store 130, the index engine 230 may add the client identifier associated with the current client to the index entry of the data block so that the client may retrieve the data block in the future. If the data block does not exist in the data store 130, the index engine 230 may create a new data entry in the data index 125 indicating an association between the client identifier of the current client and the newly added data block. The index engine 230 may be implemented as software, hardware, or a combination thereof and may correspond to one of the computing machine discussed in further details in FIG. 7.

The data verification engine 240 may perform data verifications for encrypted data to ensure that the clients, which are not necessarily trusted, truly possess the data that the client claims to possess. In one embodiment, the data verification engine 240 verifies the underlying data block without requesting the client to upload the plaintext of the data block to the server 120. By way of example, the data verification engine 240 may request the client device 110, instead of sending the plaintext of the data block, to send a first fingerprint derived from the plaintext of the data block to be uploaded to the data store 130. The data verification engine 240 may, in turn, apply a one-way function to the received first fingerprint to generate an encryption key.

The one-way function may be a hash function such as a secure hash algorithm and may take more than one inputs in generating the encryption key. For example, in one embodiment, the one-way function may use both the received first fingerprint and a client-specific value to generate the encryption key. The one-way function may further rely on a secret key or a nonce that is only known to the server 120 so that only the server 120 can generate the encryption key.

After the data is encrypted, the data verification engine 240 may also request the client device 110 to send a second fingerprint derived from the ciphertext of the data block that is encrypted using the encryption key. The data verification engine 240 uses both the first and the second fingerprints to verify the data in a manner that will be discussed in further detail below in association with FIGS. 3-5. The data verification engine 240 may be implemented as software, hardware, or a combination thereof and may correspond to one of the computing machine discussed in further details in FIG. 7.

The front-end interface engine 250 manages and operates front-end interfaces for clients to manage their files. For example, the front-end interface engine 250 provides a web user interface. When a client visits and logs on to the website of the server 120, the front-end interface engine 250 may transmit Internet data packets to cause the client device 110 to display a web user interface at the web browser of the client device 110. The front-end interface engine 250 may control the content and information displayed at the website. The front-end interface engine 250 may display files stored in the data store 130 in the forms of graphical elements in the web user interface. In another example, the front-end interface engine 250 communicates with and controls a user interface of an application run at the client device 110 to control the content and information of the application.

An entity operating the server 120 may publish the application that is installed at the client device 110. The client may manage files through the user interface of the application. In yet another example, the front-end interface engine 250 may maintain an interface in the form of API for the client devices 110 to communicate with the server 120. The front-end interface engine 250 may also provide customer support services, such as authentication management and maintaining of client preferences. The front-end interface engine 250 may be implemented as software, hardware, or a combination thereof and may correspond to one of the computing machine discussed in further details in FIG. 7.

The server 120 may also include one or more terminals 260. The terminals 260 may be connection points for the server 120 to communicate with other entities through the network 140. For example, a terminal 260 may be associated with a particular Internet Protocol (IP) address for client devices 110 to direct API commends to the server 120. The front-end interface engine 250 may be implemented as software, hardware, or a combination thereof and may correspond to one of the computing machine discussed in further details in FIG. 7.

Example Client Device

Figure 2B:
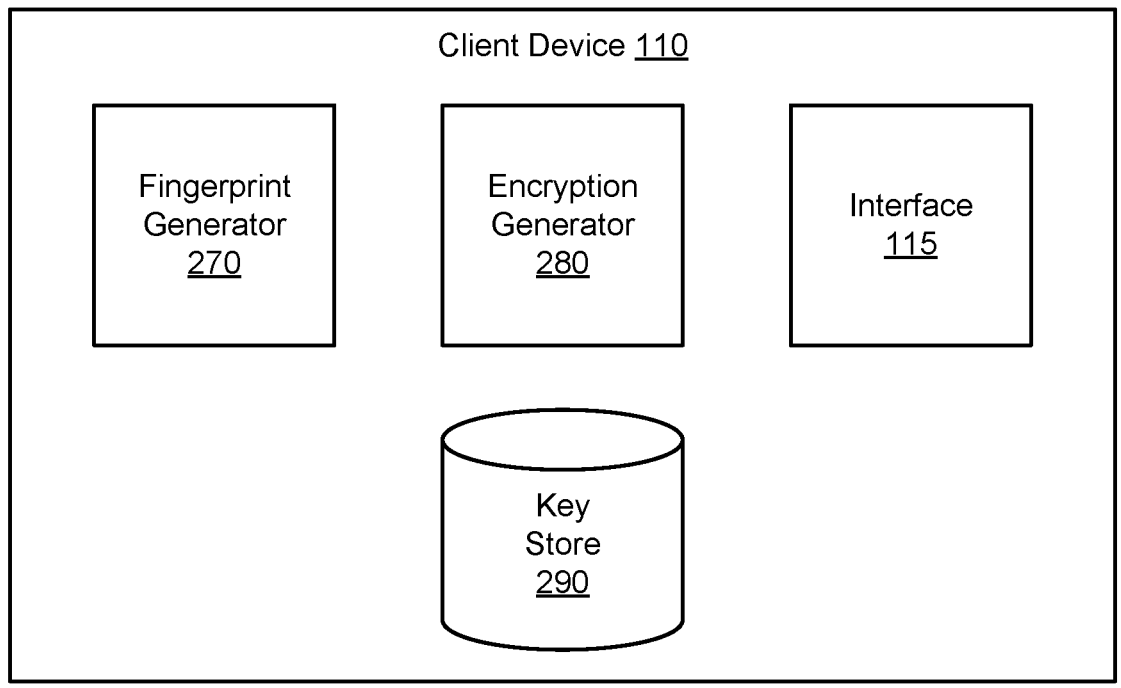
FIG. 2B illustrates a block diagram of an example client device, in accordance with an embodiment.

FIG. 2B illustrates a block diagram of an example client device 110, in accordance with an embodiment. The client device 110 may include an interface 115, a fingerprint generator 270 and an encryption generator 280, and a key store 290. As discussed, the interface 115 may take different forms. For example, the interface 115 may be an application interface, a webpage interface, or an interface that uses APIs.

The fingerprint generator 270 and encryption generator 280 may take the form of a software algorithm or dedicated hardware circuit to perform their respective function. In one embodiment, the fingerprint generator 270 may include a variety of fingerprint algorithm such as one-way functions include hash functions, checksum functions, and other different types of fingerprint algorithms. The fingerprint generator 270 allows the client device 110 to generate a fingerprint of a file. The encryption generator 280 may include a variety encryption algorithm that follows different encryption protocol such as symmetric-key cryptography, public-private key cryptography, elliptic-curve cryptography, etc. The encryption generator 280 allows the client device 110 to encrypt a file using one or more encryption keys. The key store 290 stores various encryption keys and tokens of the client device 110, including the public keys and the private keys of the client device 110, shared secrets (e.g., ephemeral keys) generated by the client device 110 with another entity, public keys shared by other entities, and other encryption related data such as digital certificates and signatures. The key store 290 may store encryption keys for encrypted data that is stored in the data store 130 so that the client device 110 may retrieve the encrypted data and use the keys to decrypt the data.

Example Data Exchange and Verification

Figure 3:
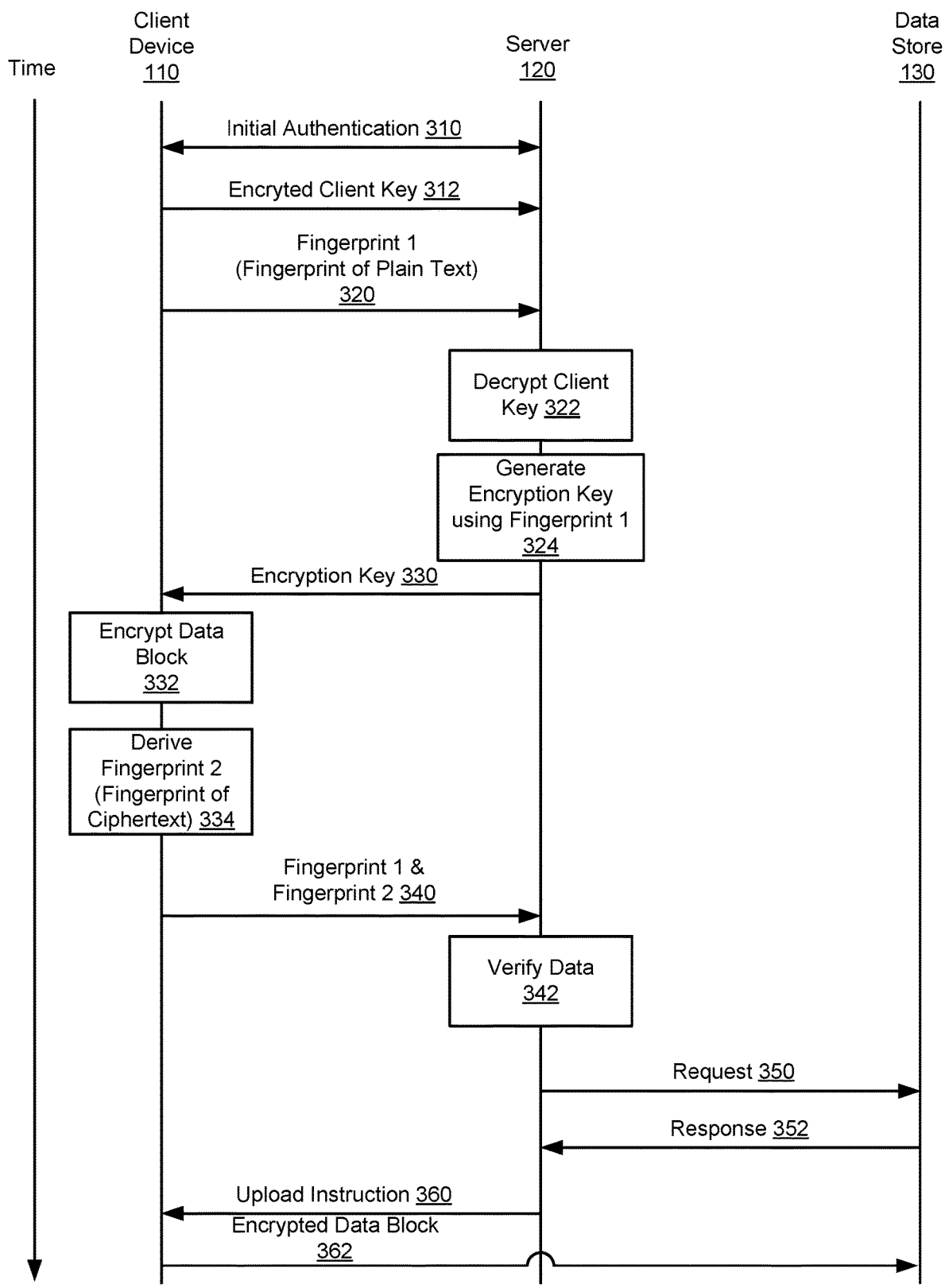
FIG. 3 illustrates an example message flowchart for the exchange of data among a client device, a server, and a data store, in accordance with an embodiment.

FIG. 3 is a message flowchart illustrating an example process for uploading an encrypted data block from a client device 110 to a data store 130 through a server 120 and a data verification process, in accordance with an embodiment. The process depicted in FIG. 3 may begin when the client device 110 and the server 120 perform an initial authentication 310. The initial authentication may include an initial handshake and the transmission of log-in credentials from the client device 110. After the client device 110 successfully logs in to an interface operated by the server 120, the server 120 may also provide a session token to the client device 110 for the further exchange of data during the session.

The client device 110 may intend to upload a data block to the data store 130. The data block may constitute an entire file to be uploaded or may be a portion of the file. To maintain the secrecy of the data block, the client device 110 may intend to upload the encrypted data block instead of the plaintext of the data block to the data store 130. Since the server 120 may not possess or receive the plaintext of the data block, the server 120 performs verification to ensure that the client device 110 truly possesses the data block. The verification may begin when the server 120, through its interface, requests the client device 110 to generate a first fingerprint of the plaintext of the data block. The client device 110 may encrypt a client key using the token sent from the server 120 and may transmit 312 the encrypted client key to the server 120.

The client device 110 derives the first fingerprint of the plaintext of the data block. In one embodiment, the first fingerprint may be the checksum of the plaintext of the data block. In one embodiment, the function that derives the first fingerprint may generate the same fingerprint for a given underlying data, regardless of the entities generating the fingerprint. For example, if a first client device generates a particular first fingerprint using a data block, a second client device independent of the first client device will generate the same first fingerprint using the same data block. After the first fingerprint is generated, the client device transmits 320 the first fingerprint to the server 120.

In some embodiments where the client device 110 transmits a client key to the server 120, the server 120 may decrypt 322 the client key using the session token. The server 120 also generates 324 an encryption key that is derived from the received first fingerprint. For example, the server 120 applies a one-way function to the first fingerprint to generate the encryption key. The one-way function may be any suitable hash function such as an SHA function. The one-way function may also take a secret key of the server 120 or a nonce that is known only to the server 120 in generating the encryption key so that only the server 120 can generate the encryption key given a particular first fingerprint. In some embodiments, the one-way function may take additional inputs such as the decrypted client key to generate the encryption key. After the encryption key is generated, the server 120 transmits 330 the encryption key to the client device.

The client device 110 uses the encryption key to encrypt 332 the data block from plaintext to ciphertext. The client device 110 derives 334 a second fingerprint of the ciphertext of the data block. In one embodiment, the second fingerprint may be the checksum of the ciphertext of the data block. In one embodiment, the function that derives the second fingerprint is the same function that is used to derive the first fingerprint. Hence, the first fingerprint and the second fingerprint are different because of the differences in the plaintext and the ciphertext of the data block.

The client device 110 transmits 340 the second fingerprint (e.g., Fingerprint 2) to the server 120. In one embodiment, the client device 110 also may transmit the first fingerprint (e.g., Fingerprint 1) to the server 120 along with the second fingerprint. The server 120 verifies the data by examining the first fingerprint and the second fingerprint to determine whether the request by the client device 110 to upload the data block is legitimate. The details of how the server 120 may determine whether the request by the client device 110 is legitimate will be further discussed in FIGS. 4 and 5.

Based on the determination result of the server 120, the server 120 may send 350 a request to the data store 130. The request may include various things such as a request for retrieving a data block that is stored in the data store 130 or a request for an address for the upload of a new data block. The exact request sent to the data store 130 may depend on data verification results that are determined by the values of the first and second fingerprints. The data store 130 provides 352 a response to the server 120. In a situation where the server 120 determines that the encrypted data block is a new data block, the server 120 provides 360 an upload instruction to the client device 110 for the client device 110 to upload the data block to the data store 130. In turn, the client device 110 transmits 362 the encrypted data block to the data store 130. The client device 110 may retain the encryption key for the decryption purpose when the encrypted data block is retrieved from the data store 130 in the future. For example, the client device 110 may retain the encryption key, the first and second fingerprints, and other related information in the key store 290 (shown in FIG. 2B).

In some embodiments, the client device 110 may perform the encryption and transmit the encrypted data block directly to data store 130 without going through the server 120. This could reduce the burden on the server 120 because the server 120 does not need to perform data encryption or receive any data block. Also, this allows the server 120 and the data store 130 to be operated by separate entities. For example, the data store 130 may be a third-party cloud object storage system such as AMAZON S3. In other embodiments, the server 120 may only request the client device 110 to provide the first fingerprint. The server 120 may generate the encryption key from the first fingerprint and perform the encryption of the data block at the server 120. In some embodiments, the second fingerprint may be derived from a deterministic function of the encrypted data block, for example by compression or by flipping the bits (e.g., using XOR). The second fingerprint generated this way may also be used as the index of the data block.

Example Server Data Verification Processes

Figure 4:
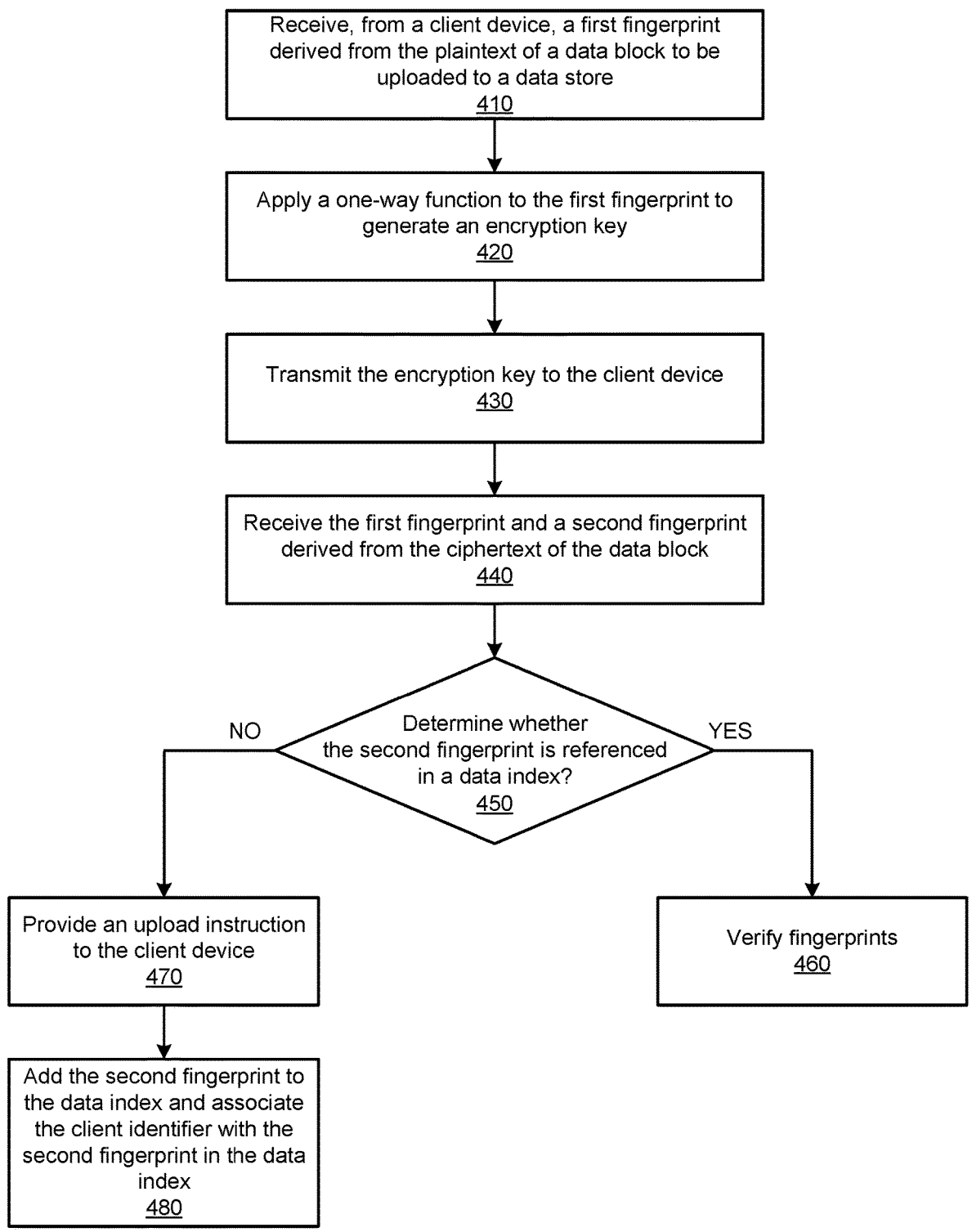
FIG. 4 is a flowchart depicting an example process operable by a server in managing incoming data blocks, in accordance with an embodiment.

FIG. 4 is a flowchart depicting an example process operable by a server 120 in managing incoming data blocks, in accordance with an embodiment. The server 120 may be in communication with a client device 110 and the data store 130. The process allows the server 120 to determine whether a client device 110 truly possesses a data block.

By way of example, the server 120 receives 410, from a client device 110, a first fingerprint derived from the plaintext of a data block that is to be uploaded to the data store 130. The first fingerprint may refer to as the plaintext fingerprint because it is generated from the plaintext of the data block. Since the first fingerprint is a summary of the underlying data block and is often derived from a one-way function, the server 120, merely based on the transmission of the first fingerprint, may not be able to determine whether the client device 110 truly possesses the data block because the client device 110 may not be a trustworthy entity. For example, the client device 110 may have eavesdropped a network communication and obtained a copy of the first fingerprint. In another scenario, the client device 110 may be in a process of performing a form of brute force attack on the server 120 and is providing a random string of bits to the server 120 as the first fingerprint in hope that the random string may match a fingerprint of a data block saved in the data store 130.

To prevent a potential attack by a malicious client device 110, the server 120 may adopt a challenge mechanism to determine whether the client device 110 truly possesses the plaintext data block. By way of example, the server 120 applies 420 a one-way function to the received first checksum that is sent from the client device 110 to generate an encryption key. The one-way function may be a hash function such as SHA256 or MD5 that generates a hash of the first fingerprint as the encryption key. The server 120 transmits 430 the encryption key to the client device. To successfully pass the challenge, the client device 110 will need to use the encryption key to encrypt the data block and generate a second fingerprint based on the ciphertext of the encrypted data block. The second fingerprint may refer to as the ciphertext fingerprint because it is generated from the ciphertext of the encrypted data block. The client device 110 transmits the second fingerprint. The server 120 receives 440 the second fingerprint that is derived from the ciphertext of the data block encrypted using the encryption key.

In a decision stage, the server 120 determines whether the ciphertext of the data block is saved in the data store by determining 450 whether the second fingerprint is referenced in a data index 125 for the data store 130. For example, one of the data entries may include or be associated with the second fingerprint. The presence of the reference of the second fingerprint in the data index 125 indicates that the ciphertext of the data block already exists in the data store 130. The server 120 may verify 460 information stored in the data entry that references the second fingerprint to determine whether the first and second fingerprints transmitted by the client device 110 is correct.

The absence of the reference of the second fingerprint in the data index 125 indicates that the ciphertext of the data block does not exist in the data store 130. In turn, the server 120 sends a request to the data store 130 to store a new incoming data block. In response, the data store 130 provides an address for the upload of the data block. In other words, in response to the second fingerprint not being referenced in the data index 125, the server 120 provides 470 an upload instruction to the client device 110 for the client device 110 to upload the data block to the data store 130. The upload instruction may include an address of the data store 130 for the data block to be uploaded to the data store 130. The server 120 also adds 480 the second fingerprint to the data index in a new index entry. In the new index entry of the data index, the server 120 also associates the client identifier corresponding to the client operating the client device with the second fingerprint and the uploaded data block stored in the data store. Hence, in the future, the server 120 may authorize the access of the data block by the client based on the association among the client identifier, the second fingerprint, and the uploaded data block. Since the second fingerprint also is stored in the data index 125, the data index 125 allows the de-duplication of encrypted data blocks without revealing the information of the plaintext of the data block. The server 120 also may store the first fingerprint, which is the fingerprint of the plaintext of the data block, in the data index 125 to associate the first fingerprint with the second fingerprint in the index entry. Additionally, the server 120 may store the encryption key in the index entry.

The authorization of the server 120 for the client device 110 to upload a new data block to the data store 130 represents two potential scenarios. In a first potential scenario, the client device 110 is legitimate and truly possesses a new data block. Hence, the upload the new data block is allowed and a new index entry is created in the data index 125. In a second potential scenario, the client device 110 may be potentially malicious and may not truly possess the new data block. However, since a new index entry is created and the new index entry is currently only associated with the potentially malicious client device 110, the client device 110 will not be able to carry out any attack until the server 120 determines that another client identifier should be associated with the index entry. How this situation is addressed will be discussed in further detail below in FIG. 5.

Figure 5:
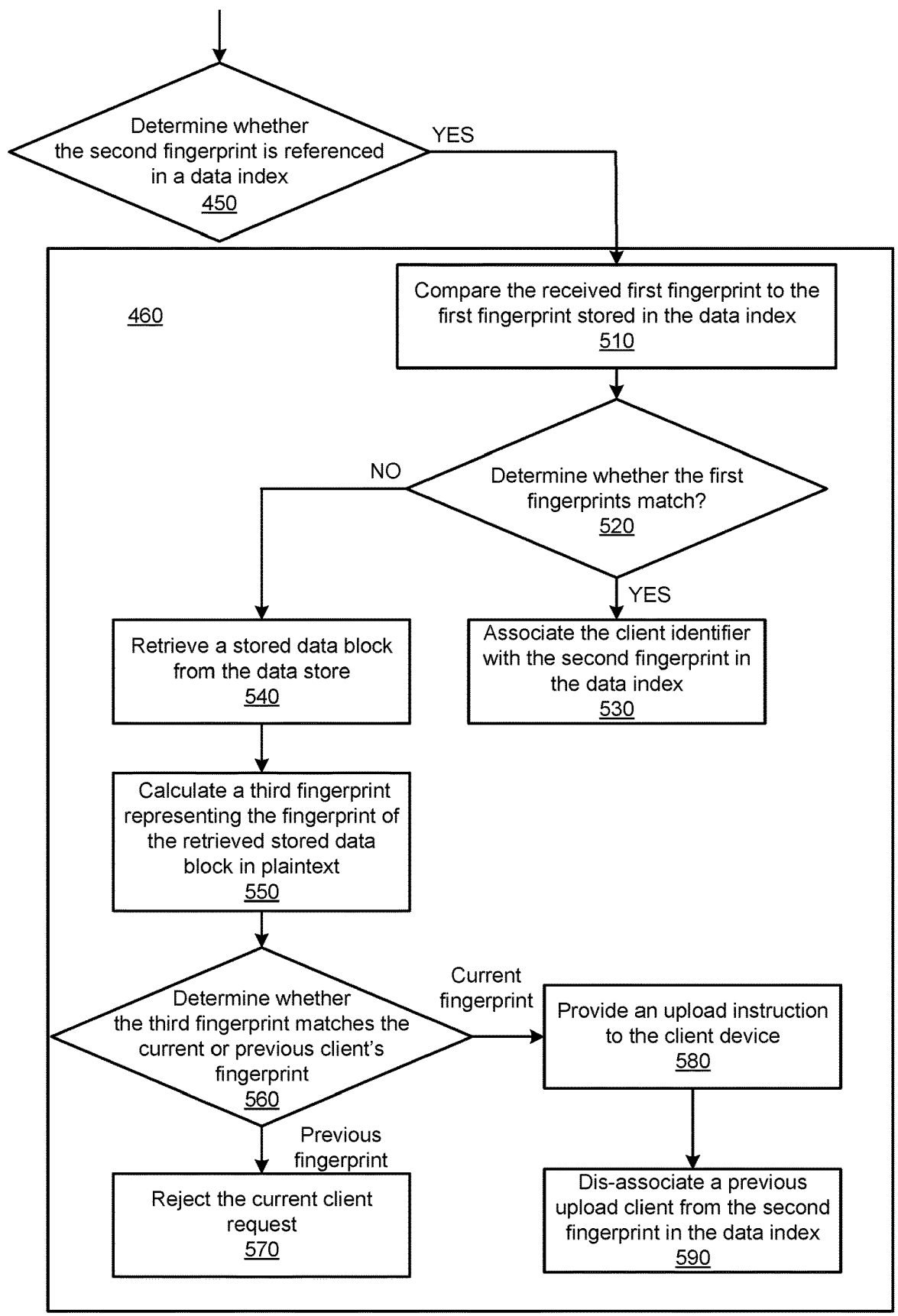
FIG. 5 is a flowchart depicting example details of verifying fingerprints of incoming data blocks, in accordance with an embodiment.

FIG. 5 is a flowchart depicting an example process for the details of the step 460 verifying fingerprints, in accordance with an embodiment. The step 450 in FIG. 5 may correspond to the same step 450 in FIG. 4. The sub-steps in block 460 in FIG. 5 describes an example process to verify the fingerprints of a data block, in accordance with an embodiment.

Referring to the decision stage 450 in FIG. 5, in response to the server 120 determining that the second fingerprint transmitted by the client device 110 is referenced in the data index 125, the server 120 compares 510 the received the first fingerprint to a stored first fingerprint stored in the data index 125. For an encrypted data block, the bits stored in the data store 130 may be the ciphertext of the data block. Hence, in an index entry for the encrypted data block, the second fingerprint, which corresponds to the actual bits stored, may be associated with or directly serve as the identifier for the index entry. In such index entry, the entry may also store the first fingerprint, although the plaintext of the data block may not be stored in the data store 130. The value of stored first fingerprint may represent a unique summary of the data block that is stored in the data store 130 and associated with the second checksum in the index entry of the data index. In sum, the stored first fingerprint is the value that is associated with the second fingerprint in the index entry in the data index 125 while the received the first fingerprint is the first fingerprint that is transmitted from the client device 110.

By comparing the received first fingerprint to the stored first fingerprint, the server 120 determines 520 whether the two first fingerprints match with each other. If the two first fingerprints match, it indicates that the client device 110 is able to pass the challenge set by the server 120 by providing both the first and second fingerprints that match the records of the data index 125. Hence, the client device 110 is likely legitimate and truly possesses the data block. In response to the received the first fingerprint matching the stored first fingerprint, the server 120 associates 530 the client identifier corresponding to the client operating the client device with the second fingerprint in the index entry of the data index. As a result, the client has the authority to retrieve the data block in the future. In one embodiment, since the data store 130 already includes the data blocks, the server 120 does not ask the client device to upload the data block again to the data store 130 to achieve de-duplication.

In response to the received first fingerprint not matching the stored first fingerprint, the server 120 retrieves 540 a stored data block from the data store 130. The stored data block is data that is stored in the data store 130 and is associated with the second fingerprint in the data index. The server 120 retrieves the stored data block because the mismatch of the first fingerprints indicates that either the original client who first uploaded the data block or the current client who is attempting to save the incoming data block makes a mistake in generating the fingerprints or even one or both of the clients are potentially malicious. The server 120 sends a request to retrieve the stored data block to the data store 130. The server 120, in turn, calculates 550 a third fingerprint that is derived from the plaintext of the stored data block that is retrieved from the data store 130. In one embodiment, the retrieved data block may be in ciphertext. The server 120 may first use the encryption key stored in the index entry to decrypt the encrypted data block and derive the third fingerprint based on the plaintext of the data block.

The server 120 compares the third fingerprint to the received first fingerprint and to the stored first fingerprint. The server 120 determines 560 whether the third fingerprint matches the received first fingerprint or the stored first fingerprint. The received first fingerprint may be referred to as the current fingerprint because it is generated by the current client. The stored first fingerprint may be referred to as the previous fingerprint because it is generated by the client who originally uploaded the data block to the data store 130.

If the third fingerprint matches the previous fingerprint, it means that the fingerprints submitted by the previous client were correct while the current client may either make a mistake or be a potentially malicious party because the plaintext of the data block purportedly possessed by the current client fails to generate the correct first fingerprint. Hence, in response to the third fingerprint matching the stored first fingerprint but not the received the first fingerprint, the server 120 rejects 570 the request from the current client device to store the data block to the data store 130. In other words, the server 120 will not put the client identifier of the current client in the index entry associated with the data block already stored in the data store 130. Also, the server 120 may flag the current client as a potentially malicious party.

If the third fingerprint matches the current fingerprint, it means that the fingerprints submitted by the current client are correct while the previous client who originally uploaded the data block may either make a mistake or be a potentially malicious party who intentionally upload wrong first and/or second fingerprints to potentially create a vulnerability in the data store 130. Hence, in response to the third fingerprint matching the received the first fingerprint but not the stored first fingerprint, the server 120 provides 580 an upload instruction to the current client device for the client device to upload the data block to the data store 130. The server 120 may dis-associate 590 the client who previously uploaded the stored data block from the second fingerprint that is stored in an index entry in the data index. Also, the server 120 may flag the client who previously uploaded the stored data block as a potentially malicious party.

Figure 6:
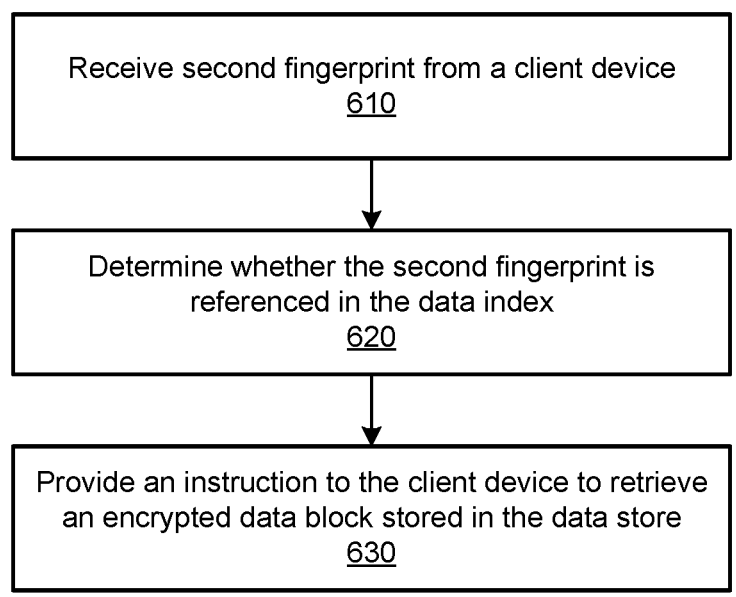
FIG. 6 is a flowchart depicting an example process for a server to allow a client device to retrieve a data block stored in a data store, in accordance with an embodiment.

FIG. 6 is a flowchart depicting an example process for a server to allow a client device to retrieve a data block that is stored in the data store 130, in accordance with an embodiment. The server 120 receives 610 a second fingerprint from a client device 110 along with a request to retrieve an encrypted data block whose ciphertext generates the second fingerprint. The server 120 determines 620 whether the second fingerprint is referenced in the data index 125. If the second fingerprint is referenced in the data index 125 (e.g., being stored as a part of index entry), this indicates that the data block exists in the data store 130. The server 120 also determines in the data entry whether the client identifier of the client is associated with the data entry. The existence of the association indicates that the client has the authority to access the data block. As such, the server 120 provides 630 an instruction to the client device to retrieve the encrypted data block from the data store 130. The client device may retrieve the encrypted data block and use the encryption key that was previously stored in the key store 290 to decrypt the data block.

Computing Machine Architecture

Figure 7:
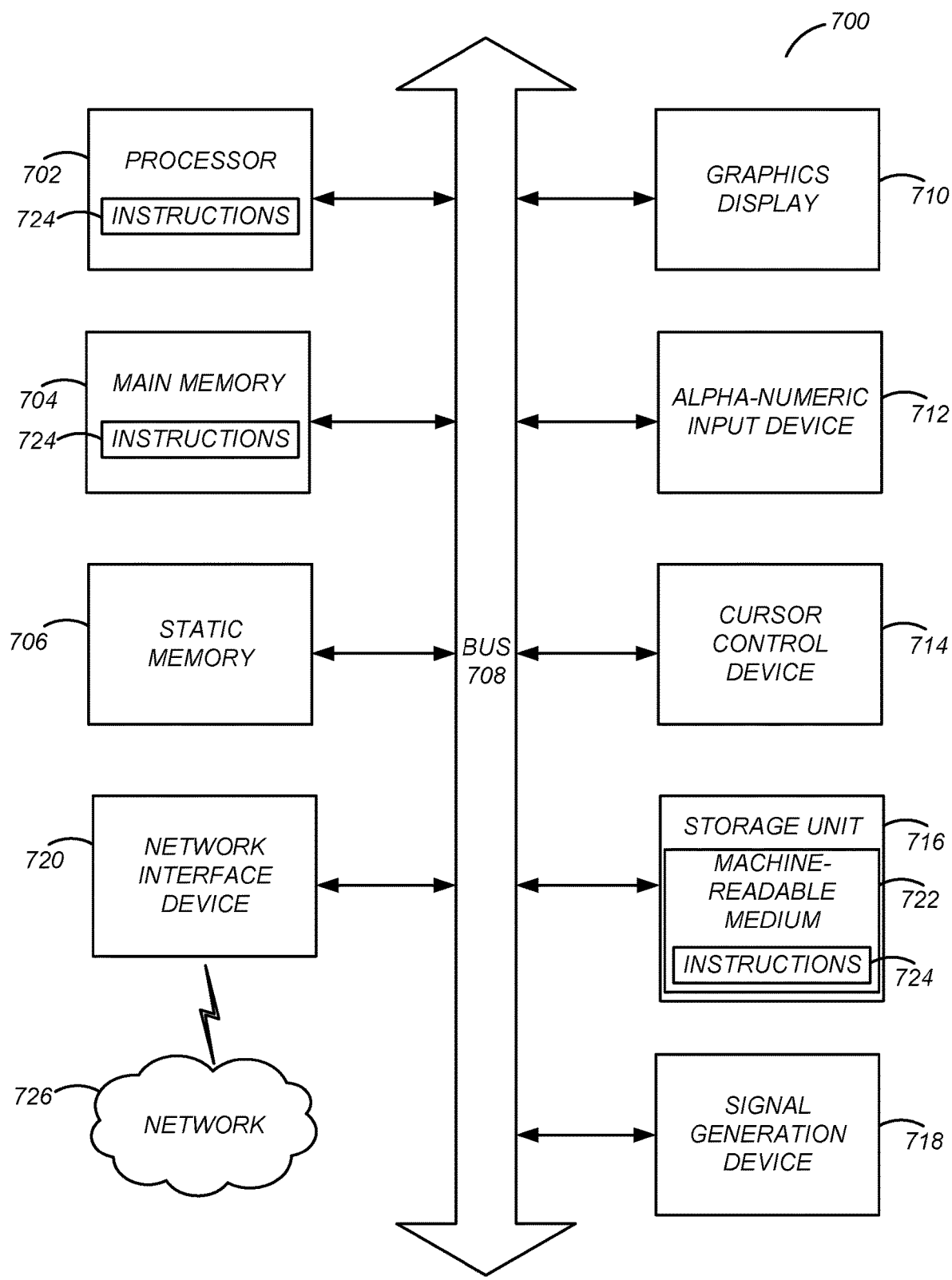
FIG. 7 is a block diagram illustrating example components of an example machine capable of reading instructions from a computer-readable medium and execute them in a processor or controller, in accordance with an embodiment.

FIG. 7 is a block diagram illustrating components of an example computing machine that is capable of reading instructions from a machine-readable medium and execute them in a processor (or controller). Specifically, FIG. 7 shows a diagrammatic representation of a computing machine in the example form of a computer system 700 within which instructions 724 (e.g., software, program code, or machine code), which may be stored in a non-transitory computer-readable medium for causing the machine to perform any one or more of the processes discussed herein, e.g., with FIGS. 1-6, may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1 and 2, including but not limited to, the client device 110, the server 120, the data store 130, the client profile store 210, the index store 220, the index engine 230, the data verification engine 240, the front-end interface engine 250 and the terminals 260. While FIG. 7 shows various hardware and software elements, each of the components described in FIGS. 1 and 2 may include additional or fewer elements.

By way of example, a computing machine used as the components shown in FIGS. 1 and 2 may be a server computer or a client computer. The server computer or client computer may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors (generally, processor 702) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Beneficially, the use of two fingerprints to verify a data block in a storage system allows untrusted clients to upload encrypted data blocks and enables the storage system to perform data de-duplication across different independent clients. Data de-duplication often make use of identical contents to reduce storage space. However, this could be in conflict with data encryption, which strives to generate ciphertext in a random manner. Hence, two independent parties who are in possession of the same data block could generate very different ciphertexts, which forces the storage system to choose between data confidentiality and reduction of storage space. The embodiments described herein solves this problem by allowing a storage system to perform both data encryption and data de-duplication. It also may simultaneously prevent potential attacks or exploitations of vulnerability by malicious parties.

By way of example, the de-duplication of encrypted data may require that independent clients encrypt data files in the same manner, thus creating a potential vulnerability if the encryption method becomes known to the public. In this disclosure, to protect the encrypted data, a trusted party, such as a server, may be used to create the encryption key that is based on the fingerprint of the plaintext of the data block and based on a hash function that is controlled by the server. The approval of an upload or association of a data block is contingent upon the client's passing a challenge that asks the client to generate two fingerprints, one based on the plaintext and another based on the ciphertext of the data block. As a result, only clients who truly possess the data block will be able to pass the challenge. Therefore, embodiments described herein allow a safe way to perform de-duplication of encrypted data among untrusted and independent clients while preventing a potentially rogue party from exploiting vulnerabilities of the storage system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, engines, modules, or mechanisms, for example, as illustrated in FIGS. 2A and 2B. Engines may constitute either software modules (e.g., code embodied on a machine-readable medium or in a transmission signal) or hardware modules. A hardware engine also may be a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or other programmable processors) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "steps" does not imply a particular order. For example, while this disclosure may describe a process that includes multiple steps sequentially, the steps in the process do not need to be performed by the specific order claimed or described in the disclosure. Some steps may be performed before others even though the other steps are claimed or described first in this disclosure.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Embodiments according to the invention are in particular disclosed in the attached claims directed to one or more systems, devices, methods and storage mediums, wherein any feature mentioned in one claim category, e.g. a method, can be claimed in another claim category, e.g. a storage medium, a system, and a computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Upon reading this disclosure, those of skill in the art will appreciate still additional alternative structural and functional designs for a system and a process for data encryption and de-duplication through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method, comprising:
   receiving, by a server and from a client device, a first fingerprint derived from a plaintext of a data block to be uploaded to a data store;
   applying, by the server, a one-way function to the first fingerprint to generate an encryption key;
   transmitting, by the server, the encryption key generated by the server to the client device;
   receiving, by the server, a second fingerprint from the client device, the second fingerprint derived from a ciphertext of the data block encrypted by the client device using the encryption key;
   determining, by the server, whether the ciphertext of the data block is a duplicated copy that has already been saved in the data store by determining whether the second fingerprint is referenced in a data index for the data store; and
   preforming a de-duplication of the data block upon determining that the ciphertext of the data block is duplicative.

2. The computer-implemented method of claim 1, wherein the one-way function is a hash function that generates a hash of the first fingerprint as the encryption key.

3. The computer-implemented method of claim 1, further comprising:
   providing, in response to the second fingerprint not being referenced in the data index, an upload instruction to the client device for the client device to upload the data block to the data store;
   adding the second fingerprint to the data index; and
   associating, in the data index, a client identifier, which corresponds to a client of the client device, with the second fingerprint and the uploaded data block stored in the data store.

4. The computer-implemented method of claim 3, wherein the upload instruction comprises an address of the data store for the data block to be uploaded to the data store.

5. The computer-implemented method of claim 1, wherein the de-duplication of the data block comprises:
   comparing, in response to the second fingerprint being referenced in the data index, a received first fingerprint to a stored first fingerprint, wherein the received first fingerprint is the first fingerprint transmitted from the client device and the stored first fingerprint is a value that is associated with the second fingerprint in the data index; and
   determining whether the received first fingerprint matches the stored first fingerprint.

6. The computer-implemented method of claim 5, wherein the value of the stored first fingerprint represents a digest of a data block stored in the data store, the data block is associated with the second fingerprint in the data index.

7. The computer-implemented method of claim 5, further comprising:
   associating, in response to the received first fingerprint matching the stored first fingerprint, a client identifier corresponding to a client of the client device with the second fingerprint in the data index.

8. The computer-implemented method of claim 5, further comprising:
   retrieving, in response to the received first fingerprint not matching the stored first fingerprint, a stored data block from the data store, wherein the stored data block is stored in the data store and is associated with the second fingerprint in the data index;

calculating a third fingerprint that is derived from a plaintext of the stored data block retrieved from the data store; and comparing the third fingerprint to the received first fingerprint and to the stored first fingerprint.

9. The computer-implemented method of claim 8, further comprising:
rejecting, in response to the third fingerprint matching the stored first fingerprint but not the received first fingerprint, a request from the client device to store the data block to the data store.

10. The computer-implemented method of claim 8, further comprising:
providing, in response to the third fingerprint matching the received first fingerprint but not the stored first fingerprint, an upload instruction to the client device for the client device to upload the data block to the data store; and dis-associating a client who previously uploaded the stored data block from the second fingerprint in the data index.

11. The computer-implemented method of claim 10, further comprising:
flagging the client who previously uploaded the stored data block as a potentially malicious party.

12. The computer-implemented method of claim 1, wherein the data store is an object data store, and the second fingerprint is used as an index entry of data block in the data index.

13. The computer-implemented method of claim 1, wherein the data store is a de-duplicated data storage and the data index uses fingerprints of ciphertexts of encrypted data to check duplications.

14. A system comprising:
a server storing a data index, the data index using fingerprints of ciphertexts of encrypted data to reference the encrypted data stored in a data store, wherein the server comprising one or more processors and memory, the memory is configured to store instructions, the instructions, when executed by the one or more processors, cause the one or more processor to:
  receive, by the server and from a client device, a first fingerprint derived from a plaintext of a data block to be uploaded to the data store;
  apply, by the server, a one-way function to the first fingerprint to generate an encryption key;
  transmit, by the server, the encryption key generated by the server to the client device;
  receive, by the server, a second fingerprint from the client device, the second fingerprint derived from a ciphertext of the data block encrypted by the client device using the encryption key;
  determine, by the server, whether the ciphertext of the data block is a duplicated copy that has already been saved in the data store by determining whether the second fingerprint is referenced in the data index; and
  preforming a de-duplication of the data block based on whether the ciphertext of the data block is determined to be duplicative;
an interface communicated to the server and run at the client device, the interface configured to:
  cause the client device to encrypt the data block using the encryption key when the encryption key is received at the client device.

15. The system of claim 14, further comprising:
the data store storing data, at least some of the data being the encrypted data.

16. The system of claim 14, wherein the data store is an object data store.

17. The system of claim 14, wherein the server is further configured to:
compare, in response to the second fingerprint being referenced in the data index, a received first fingerprint to a stored first fingerprint, wherein the received first fingerprint is the first fingerprint transmitted from the client device and the stored first fingerprint is a value that is associated with the second fingerprint in the data index; and determine whether the received first fingerprint matches the stored first fingerprint.

18. The system of claim 17, wherein the server is further configured to:
retrieving, in response to the received first fingerprint not matching the stored first fingerprint, a stored data block from the data store, wherein the stored data block is stored in the data store and is associated with the second fingerprint in the data index;

calculating a third fingerprint that is derived from a plaintext of the stored data block retrieved from the data store; and comparing the third fingerprint to the received first fingerprint and to the stored first fingerprint.

19. A non-transitory computer readable medium comprising stored instructions that, when executed by at least one processor, causes the at least one processor to:
receive, by a server and from a client device, a first fingerprint derived from a plaintext of a data block to be uploaded to a data store;
apply, by the server, a one-way function to the first fingerprint to generate an encryption key;
transmit, by the server, the encryption key generated by the server to the client device;
receive, by the server, a second fingerprint from the client device, the second fingerprint derived from a ciphertext of the data block encrypted by the client device using the encryption key;
determine, by the server, whether the ciphertext of the data block is a duplicated copy that has already been saved in the data store by determining whether the second fingerprint is referenced in a data index for the data store; and
preform a de-duplication of the data block upon determining that the ciphertext of the data block is duplicative.

20. The non-transitory compute readable medium of claim 19, wherein the stored instruction further causes the at least one processors to:
compare, in response to the second fingerprint being referenced in the data index, a received first fingerprint to a stored first fingerprint, wherein the received first fingerprint is the first fingerprint transmitted from the client device and the stored first fingerprint is a value that is associated with the second fingerprint in the data index; and determine whether the received first fingerprint matches the stored first fingerprint.

* * * * *